(12) United States Patent
Yuan

(10) Patent No.: US 12,604,093 B2
(45) Date of Patent: Apr. 14, 2026

(54) METHOD AND APPARATUS FOR STABILIZING A SHOOTING VIDEO

(71) Applicant: Black Sesame Technologies (Chengdu) Co., Ltd., Chongqing (CN)

(72) Inventor: Zhenwei Yuan, Wuhan (CN)

(73) Assignee: Black Sesame Technologies (Chengdu) Co., Ltd. (CN)

( * ) Notice: Subject to any disclaimer, the term of this patent is extended or adjusted under 35 U.S.C. 154(b) by 13 days.

(21) Appl. No.: 18/229,630

(22) Filed: Aug. 2, 2023

(65) Prior Publication Data

US 2024/0048844 A1     Feb. 8, 2024

(30) Foreign Application Priority Data

Aug. 2, 2022     (CN) .......................... 202210921981.8

(51) Int. Cl.
*H04N 23/68*          (2023.01)

(52) U.S. Cl.
CPC ......... *H04N 23/682* (2023.01); *H04N 23/681* (2023.01); *H04N 23/689* (2023.01)

(58) Field of Classification Search
CPC ............. H04N 23/681; H04N 23/6812; H04N 23/682; H04N 23/683; H04N 23/689
See application file for complete search history.

(56) References Cited

U.S. PATENT DOCUMENTS

2016/0094765 A1     3/2016     Ardö et al.

FOREIGN PATENT DOCUMENTS

| | | | | |
|---|---|---|---|---|
| CN | 111526285 A | 8/2020 | | |
| CN | 112135051 A | 12/2020 | | |
| CN | 112333385 A | 2/2021 | | |
| CN | 112565604 A | 3/2021 | | |
| CN | 112653842 A | 4/2021 | | |
| CN | 112738405 A | * 4/2021 | .......... | H04N 5/2327 |
| CN | 113395454 A | 9/2021 | | |
| CN | 113824876 A | * 12/2021 | ........ | H04M 1/72403 |
| CN | 113436113 B | 4/2023 | | |

* cited by examiner

*Primary Examiner* — Antoinette T Spinks
(74) *Attorney, Agent, or Firm* — Timothy T. Wang; Panorama IP Group

(57)          ABSTRACT
Disclosed is a method and an apparatus for shooting a video, and an electronic device. The method for shooting a video includes detecting a video image captured by a front-facing camera and performing first processing on the video if the motion state is a first motion state or no portrait is included in the video image; disabling the first processing or reducing an intensity of the first processing if the motion state is a second motion state and a portrait is included in the video image. In the scenario where a front-facing camera is in a low-frequency motion state and a portrait is included in a selfie video, first processing is disabled or an intensity of the first processing is reduced, thereby avoiding a phenomenon of human portrait deformation and background abnormality, and making a whole effect of the selfie video stable and clear.

12 Claims, 9 Drawing Sheets

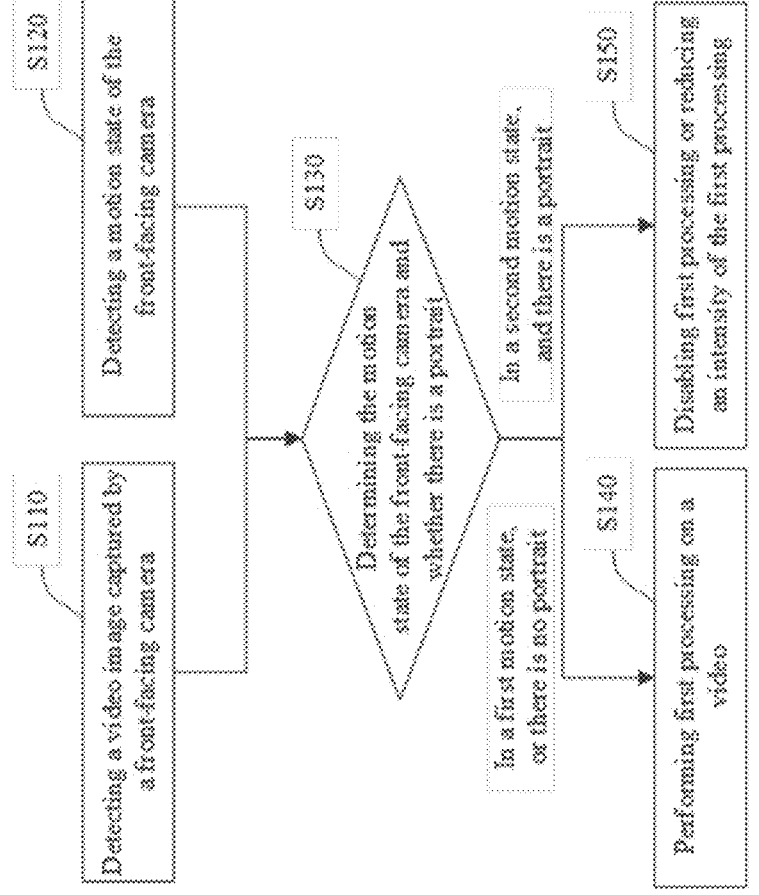

S120

Detecting a motion state of the front-facing camera

S110

Detecting a video image captured by a front-facing camera

S130

Determining the motion state of the front-facing camera and whether there is a portrait In a second motion state, and there is a portrait In a first motion state, or there is no portrait

S150

Disabling first processing or reducing an intensity of the first processing

S140

Performing first processing on a video

Fig. 1

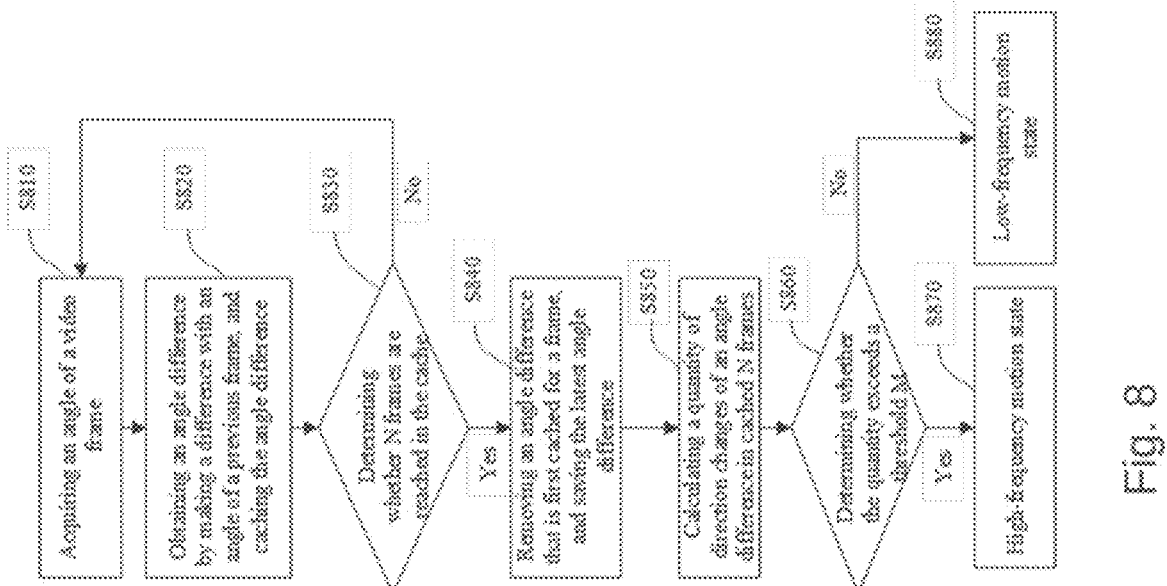

S810 Acquiring an angle of a video frame

S820 Obtaining an angle difference by making a difference with an angle of a previous frame, and caching the angle difference S830 Determining whether N frames are cached in the cache No Yes S840 Removing an angle difference that is first cached for a frame, and saving the latest angle difference S850 Calculating a quantity of direction changes of an angle difference in cached N frames S860 Determining whether the quantity exceeds a threshold N/4

No

S880 Low-frequency rotation state

Yes

S870 High-frequency rotation state

Fig. 8

METHOD AND APPARATUS FOR STABILIZING A SHOOTING VIDEO

CROSS-REFERENCE TO RELATED APPLICATIONS

The disclosure claims priority to Chinese Patent Application CN202210921981.8, filed on Aug. 2, 2022, the entire contents of which are incorporated herein by reference.

FIELD OF THE INVENTION

Embodiments of the present application relates to the field of video shooting and processing technologies, and in particular, to a method and an apparatus for shooting a video, and an electronic device.

BACKGROUND OF THE INVENTION

In daily life, an electronic device such as a hand-held device, a wearable device, or a vehicle-mounted device inevitably introduces a shake when shooting a video, which causes poor quality of a captured video image, and even affects subsequent analysis and identification. To reduce or eliminate impact of electronic device shake on the captured video, many video anti-shake technologies have been developed. During shooting of a selfie video, a final recorded video often has poor quality due to walking or running. Front-facing portrait stabilization is a relatively new topic. A common solution is to directly apply an electronic anti-shake technology to a front-facing camera, which can be implemented well in most scenarios without a portrait. However, in a commonly used scenario of taking a selfie, a captured video is relatively poor in quality.

SUMMARY OF THE INVENTION

Embodiments of the present application provide a method and an apparatus for shooting a video, and an electronic device. The following describes aspects of the embodiments of the present application.

According to a first aspect, a method for shooting a video is provided, including: detecting a video image captured by a front-facing camera; detecting a motion state of the front-facing camera; and performing first processing on the video if the motion state is a first motion state or no portrait is included in the video image; disabling the first processing or reducing an intensity of the first processing if the motion state is a second motion state and a portrait is included in the video image, where a motion frequency corresponding to the first motion state is higher than a motion frequency corresponding to the second motion state, and the first processing includes rolling shutter correction and/or video anti-shake processing.

According to a second aspect, an apparatus for shooting a video is provided, including: a front-facing camera, configured to shoot a video; and a processing module, connected to the front-facing camera and configured to perform the following operations: detecting a video image captured by the front-facing camera; detecting a motion state of the front-facing camera; and performing first processing on the video if the motion state is a first motion state or no portrait is included in the video image; disabling the first processing or reducing an intensity of the first processing if the motion state is a second motion state and a portrait is included in the video image, where a motion frequency corresponding to the first motion state is higher than a motion frequency corresponding to the second motion state, and the first processing includes rolling shutter correction and/or video anti-shake processing.

According to a third aspect, an electronic device is provided, including: a front-facing camera, configured to shoot a video; and a processor, configured to acquire the video from the front-facing camera and perform the method for the video according to the first aspect.

According to a fourth aspect, a computer-readable storage medium is provided, on which a computer program is stored. The computer program is configured to implement the method according to the first aspect.

In this embodiment of the present application, a motion state of a front-facing camera during shooting of a selfie video is acquired, and different processing is performed according to different motion states and depending on whether there is a portrait. In a scenario where a portrait is included in the selfie video, when the front-facing camera is in a low-frequency motion state, it may be considered that the front-facing camera is in a static state relative to a selfie taker, so as to disable first processing or reduce an intensity of the first processing, thereby avoiding a phenomenon of human portrait deformation and background abnormality, and making a whole effect of the selfie video stable and clear.

Other objectives and aspects of the invention will become apparent from the following detailed description, taken in conjunction with the accompanying drawings, which illustrate, by way of example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles. Furthermore, the drawings may contain text or captions that may explain certain embodiments of the present invention. This text is included for illustrative, non-limiting, explanatory purposes of certain embodiments detailed in the present invention. In the drawings:

Embodiments of the invention are described with reference to the following figures. The same numbers are used throughout the figures to reference similar features and components. The features depicted in the figures are not necessarily shown to scale. Certain features of the embodiments may be shown exaggerated in scale or in somewhat schematic form, and some details of elements may not be shown in the interest of clarity and conciseness.

FIG. 1 is a schematic flowchart of a method for shooting a video according to an embodiment of the present application.

FIG. 8 is a schematic flowchart of a possible implementation of Step S620 in the method illustrated in FIG. 6.

DETAILED DESCRIPTION OF THE INVENTION

Figure 3:
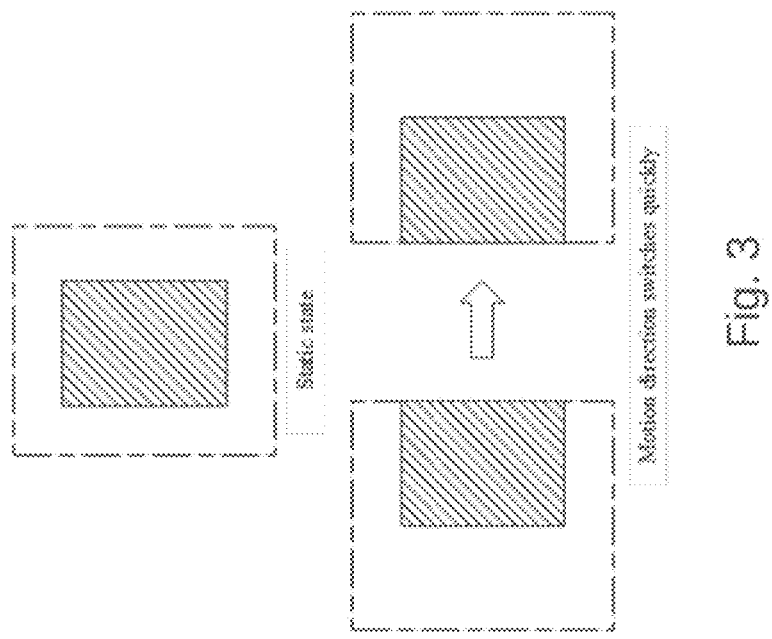
FIG. 3 is a schematic diagram of motion direction switching in video electronic anti-shake processing.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For clarity, details relating to technical material that is known in the technical fields related to the invention have not been described in detail so as not to unnecessarily obscure the present invention.

In the description and claims of the application, each of the words "units" represents the dimension in any units such as centimeters, meters, inches, foots, millimeters, micrometer and the like and forms thereof, are not necessarily limited to members in a list with which the words may be associated.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items or meant to be limited to only the listed item or items. It should be noted herein that any feature or component described in association with a specific embodiment may be used and implemented with any other embodiment unless clearly indicated otherwise.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items from the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present invention contains headers. It should be understood that these headers are used as references and are not to be construed as limiting upon the subjected matter disclosed under the header.

This specification comprises references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

The presence of broadening words and phrases such as "one or more," "at least," "but not limited to" or other like phrases in some instances shall not be read to mean that the narrower case is intended or required in instances where such broadening phrases may be absent.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred systems and methods are now described.

The following clearly and completely describes the technical solutions in the embodiments of the present application with reference to the accompanying drawings in the embodiments of the present application. Apparently, the described embodiments are merely some but not all of the embodiments of the present application.

In daily life, electronic devices such as a hand-held device, a wearable device, or a vehicle-mounted device inevitably introduces a shake when shooting a video, which causes poor video quality of a captured video image, and even affects subsequent analysis and identification. To reduce or eliminate the impact of electronic device shaking on the captured video, many video anti-shake technologies have been developed. Currently, mainstream video anti-shake technologies mainly include an optical anti-shake technology, an electronic anti-shake technology, a digital anti-shake technology, and the like.

OIS is an abbreviation of optical image stabilization (optical image stabilization, OIS), which may compensate for a shake optical path by using a built-in moveable component, such as a micro gimbal, in an electronic device, to reduce blur caused by shake in a captured picture. The OIS technology uses hardware to prevent a lens from being affected by slight shaking during shooting, making a stabilizing effect. However, hardware support is required for the device, resulting in high costs.

EIS is an abbreviation of electric image stabilization (electric image stabilization, EIS), which records a motion of an imaging device by using a sensor of an inertial measurement unit (inertial measurement unit, IMU), and estimates a motion of video frames for filtering and smoothing, to reduce a severe shake during shooting.

During shooting of a selfie video, a final recorded video often has poor quality due to walking or running. Front-facing portrait stabilization is a relatively new topic. A common solution is to directly apply the electronic anti-shake technology to a front-facing camera. The EIS technology records a motion of a front-facing camera (or body) by using an IMU sensor and estimates a motion of video frames for filtering and smoothing. The EIS technology can work well in most scenarios without a portrait. However, in a commonly used scenario of taking a selfie, especially at a low motion frequency, a captured video is relatively poor in quality, for example, problems of portrait distortion and abnormal background often occur.

In a related technology, selfie stabilization has been researched. Deep learning is used to separate a portrait from a background, and then the background is tracked by using optical flow. Grid feature matching is performed for the portrait to obtain motion trajectories of two regions, and then both filter operation and fusion transition are performed on the two motion trajectories, to ensure smoothness of each motion without affecting overall naturalness of an image. However, this solution is based on matching of image content, and thus it is easy to cause false matching once the background is simple or motion blurs, resulting in an image shake and low practical applicability.

Therefore, how to develop a front-facing video anti-shake solution adapted to various motion states is a problem that needs to be solved.

On such a basis, an embodiment of the present application provides a method for shooting a video. The following describes the embodiment of the present application in detail.

FIG. 1 is a schematic flowchart of a method for shooting a video according to an embodiment of the present application. In the method illustrated in FIG. 1, the embodiment of the present application analyzes reasons for poor quality such as deformation and abnormality of a portrait in a front-facing video, and corresponding processing is performed.

During shooting of a front-facing portrait video, two main problems may occur at a low motion frequency: portrait compression and stretching deformation and motion separation of portrait and background.

The portrait compression and stretching deformation mainly occurs in a case where a person moves with a shake of a mobile phone during selfies; and in this case, it may be considered that the person in a static state relative to the mobile phone. A major reason for the occurrence of portrait compression and stretching deformation is rolling shutter (rolling shutter, RS) correction.

A shutter, as a mechanism used by a camera to control an effective exposure time of a photosensitive film, is an important component of the camera and may usually be classified into global shutter and rolling shutter. The global shutter (global shutter, GS) is implemented by exposing a whole scene at a same time. All pixels of a sensor collect light at a same time and are exposed at a same time.

Figure 2:
FIG. 2 is a schematic diagram of an exposure manner of a rolling shutter.

The rolling shutter, different from the global shutter, is implemented by performing exposure line by line by the sensor. A complementary metal oxide semiconductor (complementary metal oxide semiconductor, CMOS) camera generally takes photos by using the rolling shutter. FIG. 2 is a schematic diagram of an exposure manner of rolling shutter of a CMOS.

As shown in FIG. 2, a common CMOS camera uses a line-by-line exposure manner. At the beginning of exposure, pixels of an image sensor are scanned and exposed line by line until all pixels are exposed. That is, there is a specific difference in an exposure time of each row. Therefore, when an imaging device shakes frequently during shooting, an image may often have an effect of content distortion such as "skew" and "wobble". This phenomenon is called a rolling shutter effect, also referred to as a jelly effect, and an RS effect for short, which are not distinguished in the present application.

Therefore, in video shooting with a shake, a jelly effect correction needs to performed on the video frames, to make sure the time at each line in the video frames is aligned with the first line, avoiding image distortion.

However, for a selfie scene with a problem, a selfie by using a mobile phone is used as an example. When a portrait is relatively stationary compared to the mobile phone, the exposure of the portrait remains the same for each line, the selfie is not affected, and there is almost no jelly effect. If jelly effect correction is still performed according to a motion state of the mobile phone and by using a conventional anti-shake processing method, portraits at different lines and different times are staggered and put together, resulting in the phenomenon of portrait compression and stretching. Therefore, when the mobile phone is substantially stationary relative to a selfie taker, an intensity of the jelly effect correction should be reduced or jelly effect correction should be disabled, to avoid the phenomenon of portrait compression and stretching.

For the motion separation of portrait and background, an example in which a mobile phone is used as a self-shooting device is used. When a portrait keeps substantially stationary relative to the mobile phone, a problem of relative motion between the portrait and the background occurs when there is switching in a motion direction.

FIG. 3 is a schematic diagram of motion direction switching in video electronic anti-shake processing. As shown in FIG. 3, a box with slanting lines represents a valid area, and a blank box represents an original image. In a static state, the valid area and the original image are concentric boxes. Due to protection of field of view (field of view, FOV), there is a relatively large difference between a stable state and an original state due to impact of a filter in a relatively large motion, and thus a critical state of being out of bounds is basically presented.

The FOV is an angle range in which a camera may receive images, which is also referred to as field of vision. An angle between lines connecting edges of a part that may be observed by human eyes in an image formed by an FOV display device and the center of human eye's pupil includes a horizontal field of view, a vertical field of view, and a diagonal field of view.

As shown in FIG. 3, it may be understood that the cutting box (namely, the box with slanting lines) is dragged along a boundary of the original image to move, and when a relatively rapid direction switching occurs, the cutting box is switched from one boundary of the original image to another, making it appear that background undergoes significant movement. This is also an inherent phenomenon caused by video electronic stabilization, and there is no objection to performing such anti-shake processing in a camera shake state.

However, during a front-facing video selfie, the portrait is very close to the mobile phone, and therefore the portrait appears to be almost motionless. If anti-shake processing continues to be performed, a state finally presented is that the portrait appears to be greatly separated from the background, which looks quite unnatural. Therefore, when the mobile phone is substantially stationary relative to the selfie taker, an intensity of anti-shake processing should be reduced as much as possible, or the anti-shake processing should be disabled, to avoid the foregoing abnormal case of portrait and background.

The foregoing abnormal phenomenon mainly occurs in a motion state with a low frequency and in a front-facing self-capturing portrait, and portrait deformation and abnormality do not occur in all motion state. Thus, it is necessary to distinguish different motion states. Therefore, in the method for shooting a video according to the embodiment of the present application illustrated in FIG. 1, whether there is a portrait in the video needs to be detected, a motion state of a front-facing camera needs to be obtained, and according to different motion states and depending on whether there is a portrait, different processing methods are used, so as to ensure overall stability and absence of abnormal cases in the front-facing self-shooting video. The method in FIG. 1 may include Step S110 to Step S150, and the following describes these steps in detail.

In Step S110, a video image captured by a front-facing camera is detected. A main purpose is to detect whether there is a portrait, which may be determined through a portrait detection solution.

In Step S120, a motion state of the front-facing camera is detected.

The front-facing camera generally refers to the front camera in a smartphone. Most phones have two cameras, the front and the rear. The camera facing a selfie taker is the front camera, which is usually used for taking selfies. Any camera facing a selfie taker is a front-facing camera. A position of the front-facing camera is not limited to the embodiment of the present application.

The front-facing camera is part of an imaging device. The imaging device may typically include a lens, a gimbal, and a body. In some embodiments, the lens is disposed on the gimbal, the gimbal is disposed on the body, and the gimbal may be a micro gimbal. The gimbal is also referred to as an optical gimbal and is a supporting device for installing and fastening an imaging device such as a mobile phone, a camera, and a video camera. The gimbal may usually rotate freely, making it convenient to use.

In some implementations, a motion state of the body of the imaging device is consistent with a motion state of the lens. A motion of the body of the imaging device is recorded by using a gyroscope with a built-in inertial measurement unit, which represents a motion of the lens. For example, in a solution using a gyroscope sensor for EIS, an attitude Euler angle of a camera may be obtained by using an attitude algorithm method, that is, a motion attitude of the lens is obtained, and then the motion state of the lens is further obtained.

In some embodiments, the imaging device may not have a gimbal, a lens is disposed on a body, and a motion state of the body of the imaging device is consistent with a motion state of the lens.

In some implementations, the motion state of the body of the imaging device is not consistent with the motion state of the lens. For example, in a device with an OIS function installed and enabled, the lens is installed on an optical gimbal. As the imaging device moves, the gimbal compensates for corresponding shake. Therefore, an attitude angle calculated by a gyroscope is not an attitude angle of the lens, and the attitude angle of the lens may be obtained by compensating for an angle change of the gimbal by using the attitude angle of the device. For example, data of the gyroscope is aligned in time and direction with data of an OIS gimbal, and the attitude angle of the lens is obtained based on angle calculation, to determine the motion state of the lens.

In some implementations, attitude angles of the lens are in a one-to-one correspondence with attitude angles of captured video frames, or a motion state of the lens during shooting of a video may be obtained based on a change of an angular velocity of the video frames captured by the lens.

The motion state of the imaging device may be determined based on frequency of motion, change frequency of a trajectory gradient direction, and the like. The motion frequency is usually low in slow motion and high in fast motion. In some implementations, the motion state may be distinguished according to the frequency of motion.

In some implementations, the motion state may be distinguished according to the change frequency of a trajectory gradient direction of the body. Motion data of consecutive N video frames captured by the front-facing camera is acquired, and a change frequency of a motion direction of the front-facing camera is determined based on change of attitude angles of the video frames, and then the motion state of the front-facing camera is determined. A specific method for determining the motion state is described in detail below.

Because rolling shutter effect correction is performed for lines in video frames, real-time video data needs to be captured. In some implementations, the motion state of the front-facing camera is estimated in real time based on N consecutive video frames formed by a current frame and a history frame, to deal with a rolling shutter effect problem in a timely manner.

The motion state of the front-facing camera may be classified into a first motion state and a second motion state. The first motion state may be a high-frequency motion state, such as a fast motion state or a shake state. The second motion state may be a low-frequency motion state, such as a slow moving state, a slow shaking state, or a slow rotating state. A motion frequency corresponding to the first motion state is higher than a motion frequency corresponding to the second motion state.

Figure 4:
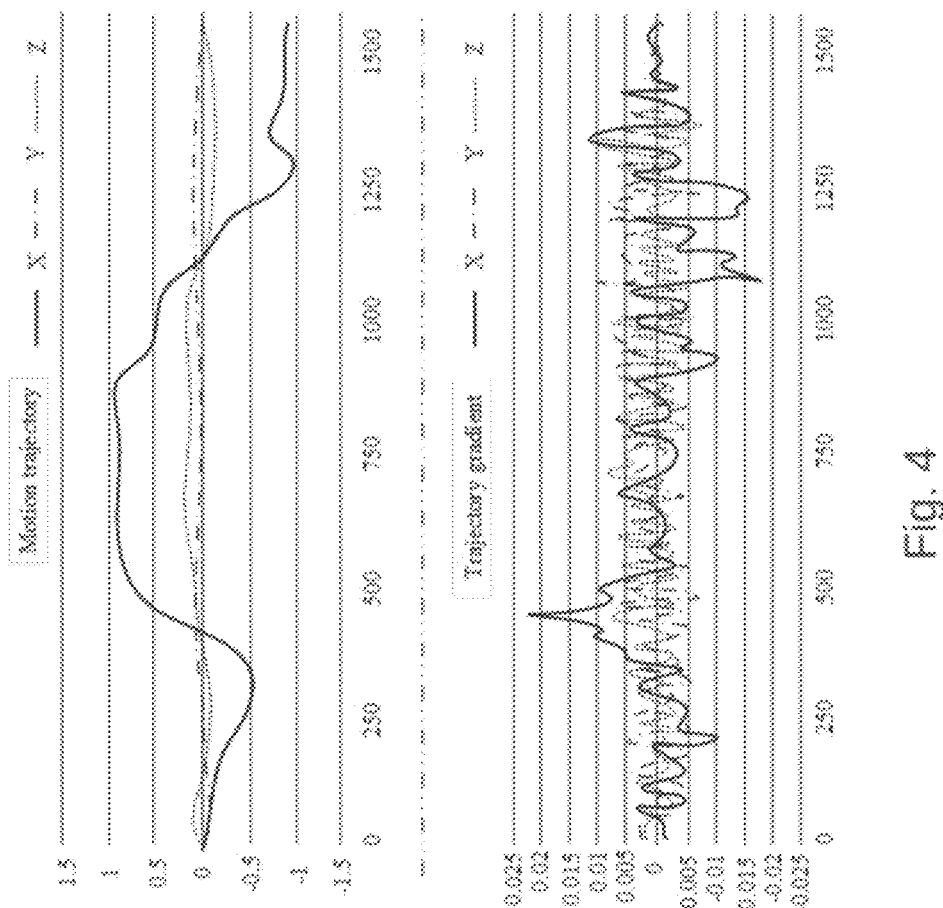
FIG. 4 is a schematic diagram of a motion trajectory and gradient direction in a first motion state.

FIG. 4 is a schematic diagram of a motion trajectory and gradient direction in a first motion state. Normal slow walking is used as an example, which belongs to a first motion state. FIG. 4 shows motion trajectories in three directions and corresponding trajectory gradients of a mobile phone (belonging to the first motion state) during normal slow walking. It may be learned that, in the first motion state, a change frequency of a gradient direction of a trajectory of the mobile phone is relatively high, belonging to the high-frequency motion state.

Figure 5:
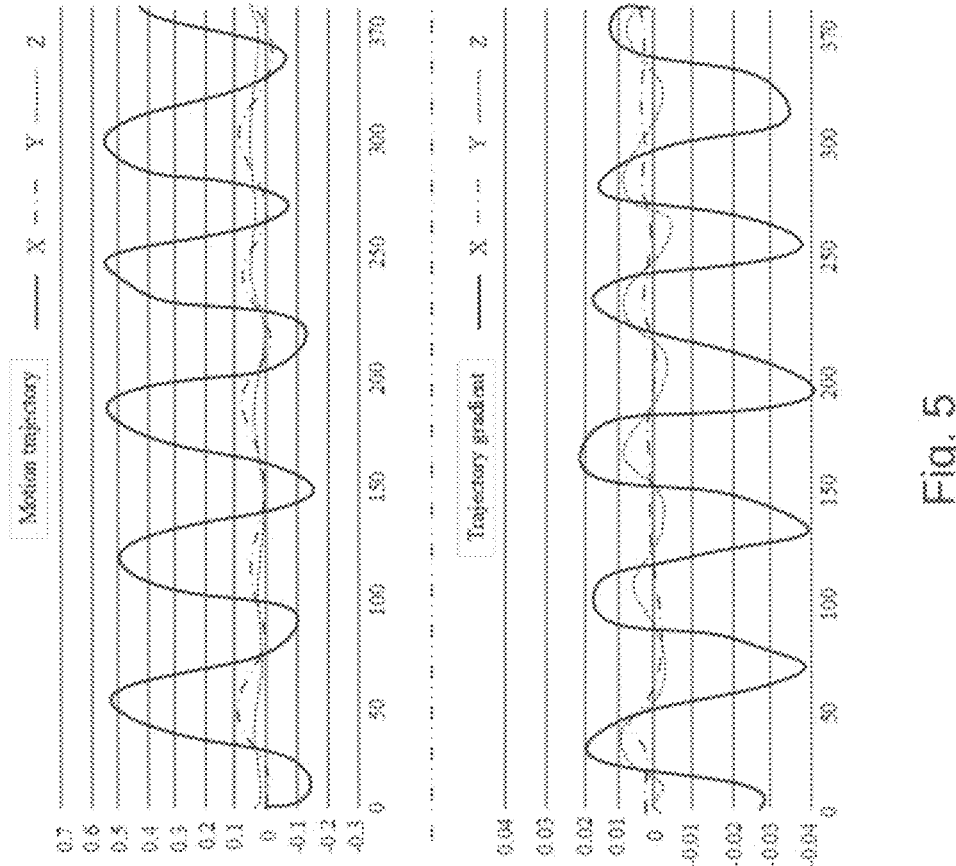
FIG. 5 is a schematic diagram of a motion trajectory and gradient direction in a second motion state.

FIG. 5 is a schematic diagram of a motion trajectory and gradient direction in a second motion state. Shaking a mobile phone is used as an example, which belongs to a low-frequency motion and is a second motion state. FIG. 5 shows motion trajectories in three directions and corresponding trajectory gradients of shaking a mobile phone (belonging to the second motion state). It may be learned that in the second motion state, a change frequency of a gradient direction of a trajectory of the mobile phone is relatively low, belonging to the low-frequency motion state. Different motion states may be distinguished by using a change frequency of a gradient direction of a trajectory.

In Step S130, the motion state of the front-facing camera and whether there is a portrait in the video are determined.

If the front-facing camera is in the first motion state, or no portrait is included in a video image, the process proceeds to Step S140. If the front-facing camera is in the second motion state, or a portrait is included in a video image, the process proceeds to Step S150.

In Step S140, when the front-facing camera is in the first motion state, or no portrait is included in a video image, first processing is performed on the video. The first processing includes rolling shutter correction and/or video anti-shake processing. In some embodiments, the first processing may be only rolling shutter correction, or the first processing may be only video anti-shake processing. In some embodiments, the first processing may alternatively be rolling shutter correction and video anti-shake processing.

A video anti-shake technology used in the front-facing camera may include an optical anti-shake technology, an electronic anti-shake technology, and a digital anti-shake technology. The video anti-shake technology may be a single anti-shake manner or may be an anti-shake manner in which a plurality of anti-shake technologies are combined. In some embodiments, the video anti-shake technology may be an electronic anti-shake technology. In some embodiments, the video anti-shake technology may alternatively be a combination of an electronic anti-shake technology and an optical anti-shake technology.

In Step S150, when the front-facing camera is in the second motion state, and a portrait is included in the video image, the first processing is disabled, or strength of the first processing is reduced.

The first processing includes rolling shutter correction and/or video anti-shake processing. The front-facing camera is in the second motion state. In some embodiments, an intensity of rolling shutter effect correction of the first processing may be correspondingly reduced. In some embodiments, rolling shutter effect correction corresponding to the first processing may be disabled. In some embodiments, an intensity of video anti-shake corresponding to the first processing may be reduced. In some embodiments, video anti-shake corresponding to the first processing may be disabled. In some embodiments, an intensity of rolling shutter correction and video anti-shake corresponding to the first processing may be reduced. In some embodiments, rolling shutter correction and video anti-shake corresponding to the first processing may be disabled.

Different processing manners are used when the front-facing camera switches from the first motion state to the second motion state, or from the second motion state to the first motion state. The first processing manner and disabling of the first processing or reduction of an intensity of the first processing are two different image stabilization manners and may be considered as two different motion trajectories. Therefore, during switching, if no processing is performed, video shake and/or a jelly effect of an image due to the switching may be caused.

In some implementations, if the front-facing camera switches from the first motion state to the second motion state, before the first processing manner being switched to reduction of an intensity of the first processing, a difference between a video frame obtained based on the first processing and an original video frame is gradually reduced, so as to reduce video shake and/or a jelly effect of an image caused by processing manner switching.

In some implementations, if the front-facing camera switches from the second motion state to the first motion state, before reduction of an intensity of the first processing being switched to the first processing manner, a difference between a video frame obtained based on the reduction of an intensity of the first processing and a video frame obtained based on the first processing manner is gradually reduced, so as to reduce video shake and/or a jelly effect of an image caused by manner switching.

In some implementations, if the front-facing camera switches from the first motion state to the second motion state, before the first processing manner being switched to disabling of the first processing, a difference between a video frame obtained based on the first processing and an original video frame is gradually reduced, to reduce video shake and/or a jelly effect of an image caused by processing manner switching.

In some implementations, if the front-facing camera switches from the first motion state to the second motion state, before the first processing manner being switched to disabling of the first processing, a difference between a video frame obtained based on the rolling shutter correction and an original video frame is gradually reduced, to reduce the jelly effect of an image caused by processing manner switching. In another example, if the front-facing camera switches from the first motion state to the second motion state, before the first processing manner being switched to disabling of the first processing, a difference between a video frame obtained based on anti-shake processing and an original video frame is gradually reduced, to reduce video shake caused by processing manner switching.

In some implementations, if the front-facing camera switches from the second motion state to the first motion state, before disabling of the first processing being switched to the first processing manner, a difference between a video frame obtained based on the disabling of the first processing and a video frame obtained based on the first processing manner is gradually reduced, so as to reduce video shake and/or a jelly effect of an image caused by manner switching.

For ease of description, some symbols are first defined. A period time of rolling shutter is T_rs, indicating a time it takes to scan from the first line to the last line. When the rolling shutter correction is performed, a time for each line is obtained based on T_rs, and a fixed value is used by default and usually determined by hardware. A filtering strength parameter in anti-shake processing is σ. A less value of σ indicates smaller filtering strength, and the value of σ being 0 indicates that filtering strength remains unchanged before and after filtering.

In some implementations, if it is determined that the front-facing camera is switched from the first motion state to the second motion state, that is, the front-facing camera is switched to the low-frequency motion state, transition processing needs to be performed, and a period time T_rs and/or filtering strength σ of the rolling shutter in the first processing manner are gradually reduced to 0. If it is determined that the front-facing camera switches from the second motion state to the first motion state, that is, the front-facing camera is switched to a high-frequency motion state, the period time T_rs and/or the filtering strength σ of the rolling shutter need to be gradually increased to a set default value T_rs^0 and σ^0, respectively.

In this embodiment of the present application, a motion state of a front-facing camera during shooting of a selfie video is acquired, and different processing is performed according to different motion states and depending on whether there is a portrait. In a scenario where a portrait is included in the selfie video, when the front-facing camera is in a low-frequency motion state, it may be considered that the front-facing camera is in a static state relative to a selfie taker, so as to disable or reduce rolling shutter effect correction and/or an intensity of video anti-shake processing, thereby avoiding a phenomenon of human portrait deformation and background abnormality, and making a whole effect of the selfie video stable and clear.

Figure 6:
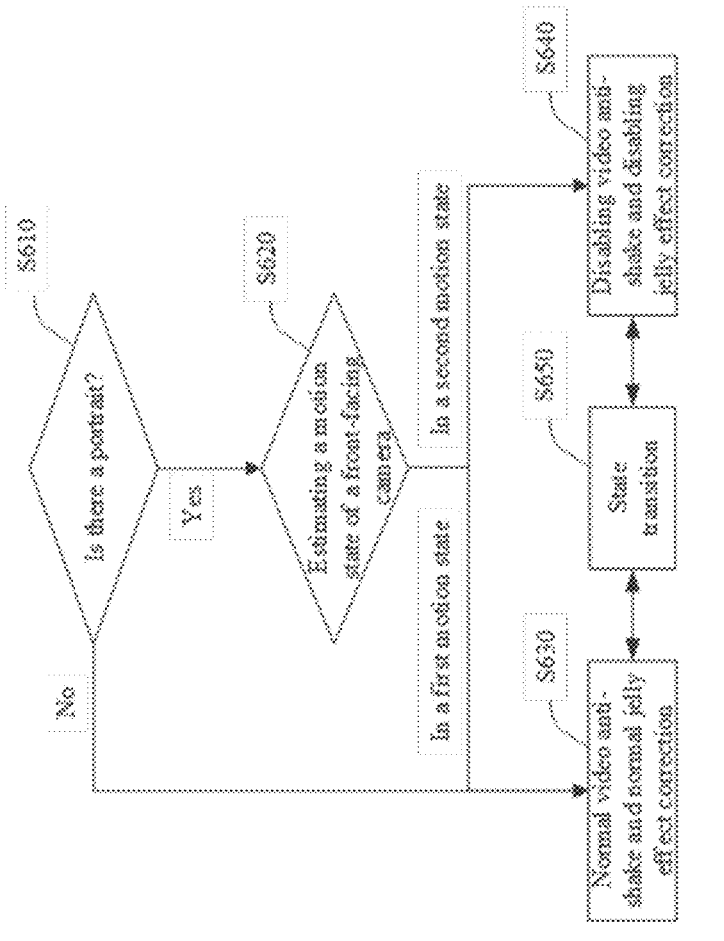
FIG. 6 is a schematic flowchart of a possible implementation of the method illustrated in FIG. 3.

FIG. 6 is a schematic flowchart of a possible implementation of the method illustrated in FIG. 1. As shown in FIG. 6, when the front-facing camera is in a first motion state, first processing used is normal anti-shake and jelly effect correction. When the front-facing camera is in a second motion state, the first processing is disabled, that is, anti-shake and jelly effect correction are disabled. During state switching, a corresponding state transition strategy is set. The method in FIG. 6 may include Step S610 to Step S650. The following describes these steps in detail.

In Step S610, it is determined whether there is a portrait in a video frame. If there is a portrait, the process proceeds to S620. If there is no portrait, the process proceeds to Step S630.

In Step S620, a motion state of the front-facing camera is estimated. A motion of the body of the imaging device may be recorded by using a gyroscope with a built-in inertial measurement unit, which represents a motion of the lens. A specific method for estimating a motion state is described in detail in the following embodiment.

If the front-facing camera is in the first motion state, the process proceeds to Step S630. If the front-facing camera is in the second motion state, the process proceeds to Step S640.

In Step S630, when the front-facing camera is in the first motion state, namely, a high-frequency motion state, the first processing is performed on the video, that is, normal anti-shake and normal jelly effect correction may be used. The normal video anti-shake may be electronic anti-shake by using a filter strength default value, or the like, and the normal jelly effect correction may be jelly effect correction that uses a default value of a period time T_rs. If a state of the front-facing camera is switched, the process proceeds to Step S650.

In Step S640, when the front-facing camera is in the second motion state, namely, a low-frequency motion state, the first processing is disabled, that is, video anti-shake and jelly effect correction are disabled. If a state of the front-facing camera is switched, the process proceeds to Step S650.

In Step S650, a state transition is used to perform a smooth transition between a first processing manner and disabling of the first processing, that is, performing transition processing on switching of a video anti-shake manner, and performing transition processing on switching of a jelly effect correction manner.

If the front-facing camera switches from the first motion state to the second motion state, Step S650 is first performed after Step S630, and then Step S640 is performed. Before the first processing manner being switched to disabling of the first processing, a difference between a video frame obtained based on video anti-shake of the first processing and an original video frame is gradually reduced, so as to reduce video shake caused by processing manner switching, and a difference between a video frame obtained based on the jelly effect correction of the first processing and an original video frame is also gradually reduced, so as to reduce a jelly effect of an image caused by processing manner switching.

If the front-facing camera switches from the second motion state to the first motion state, Step S650 is first performed after Step S640, and then Step S630 is performed. Before disabling of the first processing being switched to the first processing manner, a difference between a video frame obtained based on the disabling of the first processing and a video frame obtained based on video anti-shake of the first processing manner is gradually reduced, so as to reduce video shake caused by manner switching, and a difference between a video frame obtained based on disabling of the first processing and a video frame obtained based on jelly effect correction of the first processing manner is gradually reduced, so as to reduce a jelly effect of an image caused by manner switching.

In this embodiment of the present application, a motion state of a front-facing camera during shooting of a selfie video is acquired, and different processing is performed according to different motion states and depending on whether there is a portrait. In a scenario where a portrait is included in the selfie video, when it is determined that the front-facing camera is in a low-frequency motion state, it may be considered that the front-facing camera is in a static state relative to a selfie taker, so as to disable or reduce rolling shutter effect correction and/or video anti-shake processing, thereby avoiding human portrait deformation and background abnormality, and making a whole effect of the selfie video stable and clear.

Figure 7:
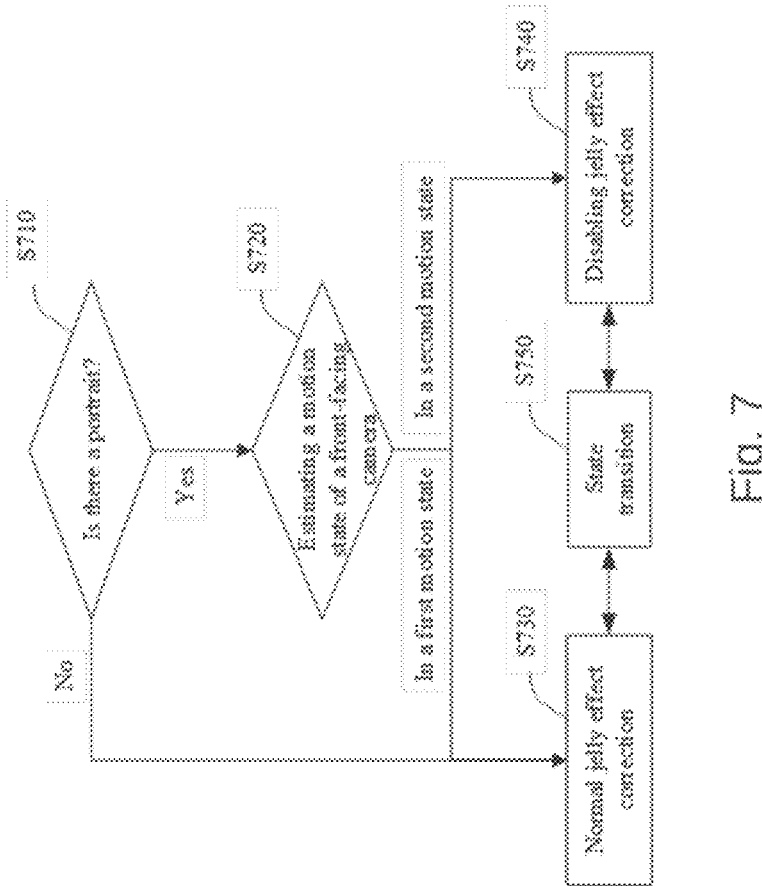
FIG. 7 is a schematic flowchart of another possible implementation of the method illustrated in FIG. 3.

FIG. 7 is a schematic flowchart of another possible implementation of the method shown in FIG. 1. As shown in FIG. 7, when a front-facing camera is in a first motion state, first processing used is jelly effect correction. When the front-facing camera is in a second motion state, the first processing is disabled, that is, the jelly effect correction is disabled. During state switching, a corresponding state transition strategy is set. The method in FIG. 7 may include Step S710 to Step S750. The following describes these steps in detail.

In Step S710, it is determined whether there is a portrait in a video frame. If there is a portrait, the process proceeds to Step S720. If there is no portrait, the process proceeds to Step S730.

In Step S720, motion state estimation of the front-facing camera is performed. If the front-facing camera is in the first motion state, the process proceeds to Step S730. If the front-facing camera is in the second motion state, the process proceeds to Step S740.

In Step S730, when the front-facing camera is in the first motion state, namely, a high-frequency motion state, the first processing is performed on the video, that is, normal jelly effect correction is used. A period time T_rs for the normal jelly effect correction is a default value. If the state of the front-facing camera is switched, the process proceeds to Step S750.

In Step S740, the front-facing camera is in the second motion state, namely, a low-frequency motion state, and then the first processing is disabled, that is, the jelly effect correction is disabled. If the state of the front-facing camera is switched, the process proceeds to Step S750.

In Step S750, a state transition strategy is used to perform a smooth transition between a first processing manner and disabling of the first processing, that is, performing transition processing on switching of a jelly effect correction manner.

If the front-facing camera switches from the first motion state to the second motion state, Step S750 is first performed after Step S730, and then Step S740 is performed. Before the first processing manner being switched to disabling of the first processing, a difference between a video frame obtained based on the jelly effect correction of the first processing and an original video frame is gradually reduced, to reduce a jelly effect of an image caused by processing manner switching.

If the front-facing camera switches from the second motion state to the first motion state, Step S750 is first performed after Step S740, and then Step S730 is performed. Before disabling of the first processing being switched to the first processing manner, a difference between a video frame obtained based on disabling of the first processing and a video frame obtained based on jelly effect correction of the first processing manner is gradually reduced, to reduce a jelly effect of an image caused by manner switching.

FIG. 8 is a schematic flowchart of a possible implementation of Step S620 in the method illustrated in FIG. 6. In the method illustrated in FIG. 8, a motion state of the front-facing camera is estimated based on a historical frame and according to a change frequency of a trajectory gradient direction. Then, for the low-frequency motion state, processing of disabling rolling shutter effect correction and reducing an intensity of anti-shake processing may be performed. A number N of buffer frames and a threshold M of direction transformation are both adjustable parameters.

The method in FIG. 8 mainly includes Step S810 to Step S880. The following describes these steps in detail.

In Step S810, an angle of a video frame is acquired. In some embodiments, an attitude angle of a lens is obtained by means of angle calculation based on data from a gyroscope, that is, an attitude angle of the video frame is obtained.

In Step S820, an angle difference is obtained by making a difference with an angle of a previous frame, and the angle difference is cached. An angular velocity of the video frame may be obtained based on a change of the attitude angle of the video frame relative to an attitude angle of a previous frame.

In Step S830, it is determined whether N frames are reached in the cache. If N frames are reached, Step S840 is performed; otherwise, the process returns to Step S810 to continue with statistics of an angle of a next frame.

In Step S840, an angle difference that is first cached for a frame is removed, and the latest angle difference is saved. That is, angle difference data of N continuous frames is updated and kept as real-time data.

In Step S850, a quantity of direction changes of an angle difference in cached N frames is calculated.

In Step S860, it is determined whether the quantity of direction changes exceeds the threshold M. If the quantity is greater than the threshold M, the process proceeds to Step S870; otherwise, the process proceeds to Step S880.

In Step S870, the quantity of direction changes is greater than the threshold M, which indicates that the front-facing camera is in the first motion state, namely, a high-frequency motion state.

In Step S880, the quantity of direction changes is not greater than the threshold M, which indicates that the front-facing camera is in the second motion state, namely, a low-frequency motion state.

Figure 9:
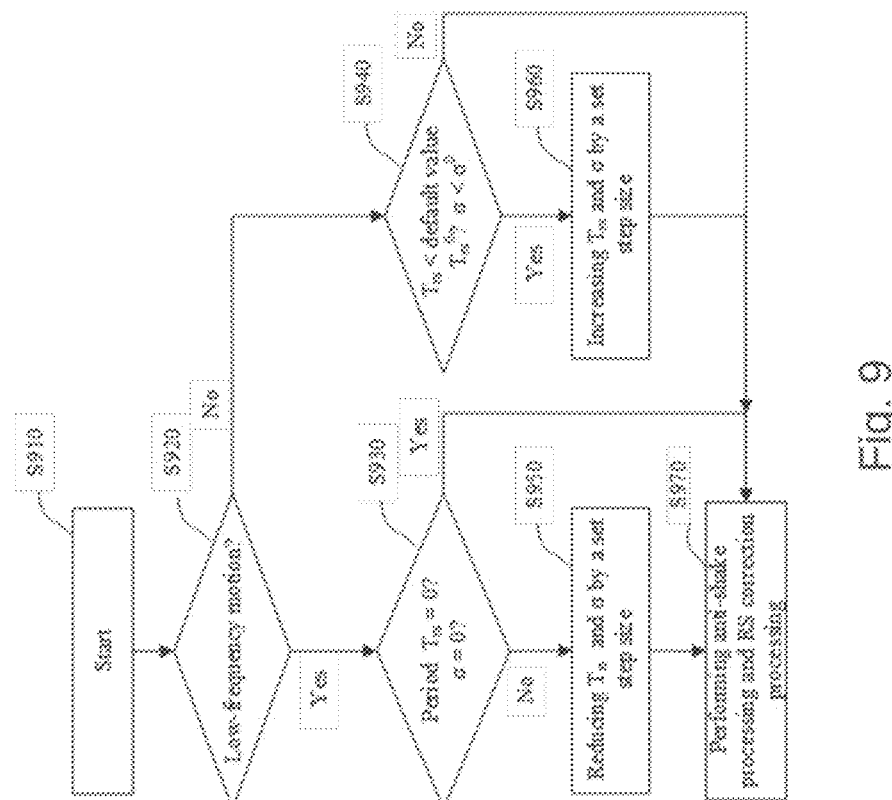
FIG. 9 is a schematic flowchart of a possible implementation of Step S650 in the method illustrated in FIG. 6.

FIG. 9 is a schematic flowchart of a possible implementation of Step S650 in the method illustrated in FIG. 6. As shown in FIG. 9, a period time of rolling shutter is T_rs, indicating a time it takes to scan from the first line to the last line. A filtering strength parameter in anti-shake processing is $\sigma$. A less value of $\sigma$ indicates smaller filtering strength, and the value of $\sigma$ being 0 indicates that filtering strength remains unchanged before and after filtering.

When a front-facing camera switches between motion states, a video processing manner is switched. During switching of the processing manner, transition processing is performed, so as to avoid video shake and a jelly effect of an image caused by the switching.

In some implementations, if the front-facing camera is switched from the first motion state to the second motion state, that is, the front-facing camera is switched to a low-frequency motion state, transition processing needs to be performed, and a period time T_rs and/or filtering strength $\sigma$ of rolling shutter in the first processing manner are gradually reduced to 0. If the front-facing camera switches from the second motion state to the first motion state, that is, the front-facing camera is switched to a high-frequency motion state, the period time T_rs and/or the filtering strength $\sigma$ of the rolling shutter need to be gradually increased to a set default value T_rs^0 and $\sigma$^0, respectively.

The method in FIG. 9 mainly includes Step S910 to Step S970. The following describes these steps in detail.

In Step S910, the process starts, and an angle of a video frame is acquired.

In Step S920, it is determined whether a front-facing camera is in a low-frequency motion. If yes, the process proceeds to Step S930; otherwise, the process proceeds to Step S940.

In Step S930, it is determined whether the period time Trs is 0 and whether the filtering intensity $\sigma$ is 0. If yes, the process proceeds to Step S970; otherwise, the process proceeds to Step S950.

In Step S940, it is determined whether the period time Trs is less than a default value T_rs^0 and whether the filtering strength $\sigma$ is less than a default value $\sigma$^0. If yes, the process proceeds to Step S960; otherwise, the process proceeds to Step S970.

In Step S950, the period time Trs and the filtering intensity $\sigma$ are decreased by a set step size. The step size may be set in advance, and the step size may also be adjustable, so as to gradually reduce a difference between a video frame obtained based on first processing and a video frame obtained based on disabling of the first processing manner.

In Step S960, the period time Trs and the filtering intensity $\sigma$ are increased by a set step size, so as to gradually reduce a difference between a video frame obtained based on disabling of the first processing and a video frame obtained based on the first processing manner.

In Step S970, the anti-shake processing and RS correction processing are performed.

If the front-facing camera switches to the first motion state, first processing for a video frame is performed, that is, normal video anti-shake and normal jelly effect correction are performed based on the period time Trs and the filtering intensity σ that are obtained after transition switching. If the front-facing camera switches to the second motion state, the first processing for the video frame is disabled. After transition switching, a period time Trs of jelly effect correction is 0, and a filtering intensity σ of video anti-shake is 0, that is, the video anti-shake and the jelly effect correction are disabled.

The foregoing describes the method embodiments of the present application in detail with reference to FIG. 1 to FIG. 9. The following describes an apparatus embodiment of the present application in detail with reference to FIG. 10. It should be understood that the description of the apparatus embodiment corresponds to the description of the method embodiments, and therefore, for parts that are not described in detail, reference may be made to the foregoing method embodiments.

Figure 10:
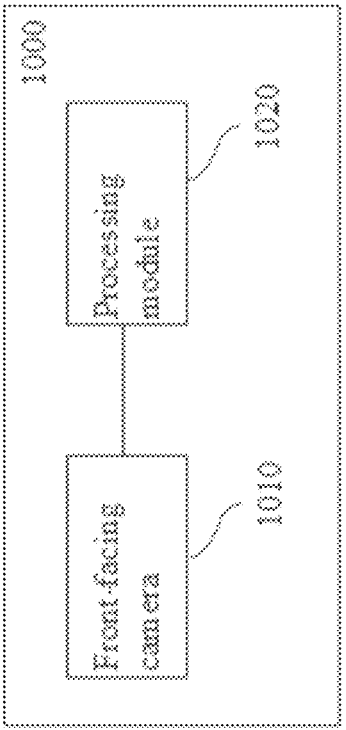
FIG. 10 is a schematic structural diagram of an apparatus for shooting a video according to an embodiment of the present application.

FIG. 10 is a schematic structural diagram of an apparatus for shooting a video according to an embodiment of the present application. As shown in FIG. 10, the apparatus 1000 for shooting a video may include a front-facing camera 1010 and a processing module 1020.

The front-facing camera 1010 is configured to shoot a video.

The processing module 1020 is connected to the front-facing camera 1010 and configured to perform the following operations: detecting a video image captured by the front-facing camera 1010; detecting a motion state of the front-facing camera 1010; and performing first processing on the video if the motion state is a first motion state or no portrait is included in the video image; disabling the first processing or reducing an intensity of the first processing if the motion state is a second motion state and a portrait is included in the video image, where a motion frequency corresponding to the first motion state is higher than a motion frequency corresponding to the second motion state, and the first processing includes rolling shutter correction and/or video anti-shake processing.

Optionally, motion data of consecutive N video frames captured by the front-facing camera is acquired, and a change frequency of a motion direction of the front-facing camera is determined based on change of attitude angles of the video frames, and then the motion state of the front-facing camera is determined.

Optionally, if the front-facing camera switches from the first motion state to the second motion state, before the first processing manner being switched to reduction of an intensity of the first processing, a difference between a video frame obtained based on the first processing and an original video frame is gradually reduced, so as to reduce video shake and/or a jelly effect of an image caused by processing manner switching.

Optionally, if the front-facing camera switches from the second motion state to the first motion state, before reduction of an intensity of the first processing being switched to the first processing manner, a difference between a video frame obtained based on the reduction of an intensity of the first processing and a video frame obtained based on the first processing manner is gradually reduced, so as to reduce video shake and/or a jelly effect of an image caused by manner switching.

Optionally, the first processing is an electronic anti-shake technology. In some embodiments, the first processing is jelly effect correction. In some embodiments, the first processing is jelly effect correction and an electronic anti-shake technology.

In this embodiment of the present application, a motion state of a front-facing camera during shooting of a selfie video is acquired, and different processing is performed according to different motion states and depending on whether there is a portrait. In a scenario where a portrait is included in the selfie video, when the front-facing camera is in a low-frequency motion state, it may be considered that the front-facing camera is in a static state relative to a selfie taker, so as to disable or reduce rolling shutter effect correction and/or an intensity of video anti-shake processing, thereby avoiding a phenomenon of human portrait deformation and background abnormality, and making a whole effect of the selfie video stable and clear.

Figure 11:
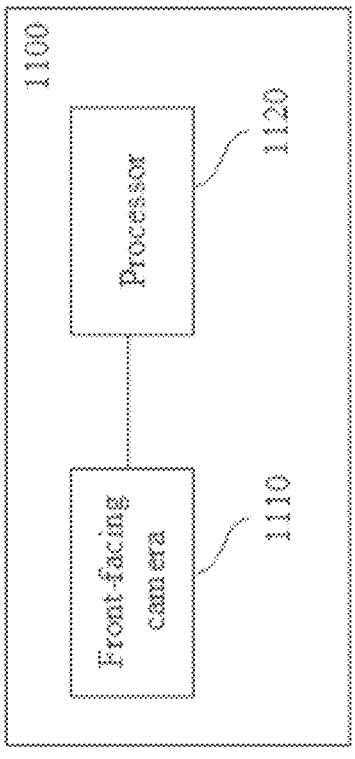
FIG. 11 is a schematic structural diagram of an electronic device according to an embodiment of the present application.

FIG. 11 is a schematic structural diagram of an electronic device according to an embodiment of the present application. As shown in FIG. 11, an electronic device 1100 may include a front-facing camera 1110 and a processor 1120.

The front-facing camera 1110 is configured to shoot a video.

The processor 1120 is configured to acquire a video from the front-facing camera 1110 and perform the method for the video according to any one of the foregoing descriptions.

It should be noted that the electronic device mentioned in this embodiment of the present application is an electronic device that includes microelectronic components and has a shooting function, and refers to a device that may include electronic components such as an integrated circuit, a transistor, and an electronic transistor and that is used to function by using an electronic technology (including software). The electronic device may be a random device, and the electronic device may be referred to as a terminal, a portable terminal, a mobile terminal, a communications terminal, a portable communications terminal, a portable mobile terminal, a touchscreen, or the like. For example, the electronic device may be but is not limited to a smartphone, a digital camera, a camera, a laptop, a tablet, a smartphone, a portable phone, a game console, a television, a display unit, a personal media player (personal media player, PMP), a personal digital assistant (personal digital assistant, PDA), a robot controlled by an electronic computer, or the like in various forms. The electronic device may also be a portable communications terminal that has a wireless communication function and a pocket size.

An embodiment of the present application further provides a computer-readable storage medium, and a computer program is stored on the computer-readable storage medium. The computer program is used to implement the method described in any one of the foregoing descriptions.

It should be understood that the computer-readable storage medium mentioned in this embodiment of the present application may be any usable medium readable by a computer, or a data storage device, such as a server or a data center, integrating one or more usable media. The usable medium may be a magnetic medium (for example, a floppy disk, a hard disk, or a magnetic tape), an optical medium (for example, a digital versatile disc (digital video disc, DVD)), a semiconductor medium (for example, a solid-state drive (solid state disk, SSD)), or the like.

It should be understood that, in various embodiments of the present application, "first", "second", and the like are used to distinguish between different objects, rather than to describe a specific order. Sequence numbers of the foregoing processes do not mean execution sequences. The execution sequences of the processes should be determined according to functions and internal logic of the processes and should not be construed as any limitation on the implementation processes of the embodiments of the present application.

In several embodiments provided in the present application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

In the several embodiments provided in the present application, it should be understood that when a part is referred to as being "connected" or "connected" to another part, it means that the part may not only be "directly connected", but also "electrically connected", and another element intervenes. In addition, the term "connection" also means "physical connection" and "wireless connection" of the portion. In addition, when a part is referred to as "include" an element, it means that the portion may include another element, not exclude another element, unless otherwise stated.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of the embodiments.

In addition, function units in the embodiments of the present application may be integrated into one processing unit, or each of the units may exist alone physically, or two or more units may be integrated into one unit.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

While illustrative implementations of the application have been described in detail herein, it is to be understood that the inventive concepts may be otherwise variously embodied and employed, and that the appended claims are intended to be construed to include such variations, except as limited by the prior art.

Reference throughout this specification to "one implementation" or "an implementation" means that a particular feature, structure, or characteristic described in connection with the implementation is included in at least one implementation of the present invention. Thus, the appearances of the phrases "in one implementation" or "in some implementations" in various places throughout this specification are not necessarily all referring to the same implementation. Furthermore, the particular features, structures, or characteristics may be combined in any suitable manner in one or more implementations.

Systems and methods describing the present invention have been described. It will be understood that the descriptions of some embodiments of the present invention do not limit the various alternative, modified, and equivalent embodiments which may be include within the spirit and scope of the present invention as defined by the appended claims. Furthermore, in the detailed description above, numerous specific details are set forth to provide an understanding of various embodiments of the present invention. However, some embodiments of the present invention may be practiced without these specific details. In other instances, well known methods, procedures, and components have not been described in detail so as not to unnecessarily obscure aspects of the present embodiments.

The invention claimed is:

1. A method for shooting a video, comprising:
detecting a video image captured by a front-facing camera;
detecting a motion state of the front-facing camera; and
determining whether there is a portrait in the video image:
performing a first processing on the video when the motion state is a first motion state;
performing the first processing on the video when no portrait is included in the video image;
disabling the first processing or reducing an intensity of the first processing when the motion state is a second motion state and a portrait is included in the video image: wherein a motion frequency corresponding to the first motion state is higher than a motion frequency corresponding to the second motion state, and the first processing comprises rolling shutter correction and/or video anti-shake processing.

2. The method according to claim 1, wherein the detecting the motion state of the front-facing camera comprises:
acquiring consecutive N video frames captured by the front-facing camera;
determining a change frequency of a motion direction of the front-facing camera based on a difference between adjacent frames in the N video frames; and
determining the motion state of the front-facing camera based on the change frequency of the motion direction of the front-facing camera.

3. The method according to claim 1, wherein the method further comprises:
obtaining a difference between a video frame obtained based on the first processing and an original video frame is gradually reduced prior before the first processing manner being switched to disabling of the first processing; and
gradually reducing an intensity of the first processing in response to the motion state of the front-facing camera switching from the first motion state to the second motion state.

4. The method according to claim 1, wherein the method further comprises:
obtaining a difference between a video frame obtained based on the disabling of the first processing and a video frame obtained based on the first processing manner is gradually reduced prior to enabling the first processing based on switching from the second motion state to the first motion state; and
gradually increasing an intensity of the first processing in response to the motion state of the front-facing camera switching from the second motion state to the first motion state.

5. The method according to claim 1, wherein the video anti-shake processing is an electronic anti-shake processing.

6. An apparatus for shooting a video, comprising:

a front-facing camera, configured to shoot a video; and a processing module, connected to the front-facing camera and configured to perform the following operations:

detecting a video image captured by a front-facing camera;

detecting a motion state of the front-facing camera; and determining whether there is a portrait in the video image;

performing a first processing on the video when the motion state is a first motion state; performing the first processing on the video when no portrait is included in the video image;

disabling the first processing or reducing an intensity of the first processing when the motion state is a second motion state and a portrait is included in the video image;

wherein a motion frequency corresponding to the first motion state is higher than a motion frequency corresponding to the second motion state, and the first processing comprises rolling shutter correction and/or video anti-shake processing.

7. The apparatus according to claim 6, wherein the detecting a motion state of the front-facing camera comprises:

acquiring consecutive N video frames captured by the front-facing camera;

determining a change frequency of a motion direction of the front-facing camera based on a difference between adjacent frames in the N video frames; and determining the motion state of the front-facing camera based on the change frequency of the motion direction of the front-facing camera.

8. The apparatus according to claim 6, wherein the processing module is further configured to perform the following operation:

obtaining a difference between a video frame obtained based on the first processing and an original video frame is gradually reduced prior before the first processing manner being switched to disabling of the first processing; and gradually reducing an intensity of the first processing in response to the motion state of the front-facing camera switching from the first motion state to the second motion state.

9. The apparatus according to claim 6, wherein the processing module is further configured to perform the following operation:

obtaining a difference between a video frame obtained based on the disabling of the first processing and a video frame obtained based on the first processing manner is gradually reduced prior to enabling the first processing based on switching from the second motion state to the first motion state; and gradually increasing an intensity of the first processing in response to the motion state of the front-facing camera switching from the second motion state to the first motion state.

10. The apparatus according to claim 6, wherein the video anti-shake processing is an electronic anti-shake processing.

11. An electronic device, comprising:

a front-facing camera, configured to shoot a video; and a processor, configured to acquire the video from the front-facing camera and perform the methods according to claim 1.

12. A non-transitory computer-readable storage medium on which a computer program is stored, wherein the computer program is used to implement the method according to claim 1.

* * * * *